US005689728A

United States Patent [19]

Sugimoto et al.

[11] Patent Number: 5,689,728

[45] Date of Patent: Nov. 18, 1997

[54] CONTROLLER OF PATHS FOR DATA TRANSFER IN SYSTEM HAVING EXTERNAL MEMORY DEVICE

[75] Inventors: Shuji Sugimoto; Norio Hamada; Yoshiro Shiroyanagi; Hisaharu Takeuchi, all of Odawara, Japan

[73] Assignee: Hitachi, Ltd., Tokyo, Japan

[21] Appl. No.: 395,766

[22] Filed: Aug. 18, 1989

[30] Foreign Application Priority Data

Aug. 30, 1988 [JP] Japan .................................. 63-213566

[51] Int. Cl.[6] .................................................. G06F 13/38

[52] U.S. Cl. ............................................................ 395/858

[58] Field of Search .............................. 364/200 MS File, 364/900 MS File; 395/425, 325

[56] References Cited

U.S. PATENT DOCUMENTS

| | | | |
|---|---|---|---|
| 4,413,317 | 11/1983 | Swenson | 364/200 |
| 4,429,363 | 1/1984 | Duke et al. | 364/200 |
| 4,433,374 | 2/1984 | Hanson et al. | 395/425 |
| 4,466,059 | 8/1984 | Bastian et al. | 364/200 |
| 4,500,954 | 2/1985 | Duke et al. | 364/200 |
| 4,571,674 | 2/1986 | Hartung | 364/200 |
| 4,851,993 | 7/1989 | Chen et al. | 364/200 |
| 4,968,977 | 11/1990 | Chinnaswamy et al. | 340/825.8 |

*Primary Examiner*—Richard L. Ellis
*Attorney, Agent, or Firm*—Kenyon & Kenyon

[57] ABSTRACT

In a magnetic disk controller equipped with a cache memory for disks, the controller in accordance with the present invention includes high order paths for data transfer between a high order channel apparatus and the cache memory through a certain one of a plurality of channel adaptors, low order paths for data transfer between a low order device, e.g. a magnetic disk device, and the cache memory through a certain one of a plurality of device adaptors and a path for data transfer betweeen the low order device and the channel cevice without passing through the cache memory by selecting empty device adaptor and channel adaptor by the switching operation of a switch. When an interrupt is generated from the device, data transfer can be made easily even when the high order path and the low order path are busy, and path utilization efficiency can be improved.

5 Claims, 3 Drawing Sheets

CONTROLLER OF PATHS FOR DATA TRANSFER IN SYSTEM HAVING EXTERNAL MEMORY DEVICE

BACKGROUND OF THE INVENTION

1. Field of the Invention

This invention relates to a path controller for data transfer between a high order channel apparatus and a low order device in a system including an external memory device having a cache memory and to a path controller suitable for improving utilization efficiency of transfer paths between high order channel and low order device.

2. Description of the Prior Art

The data transfer modes in a disk controller equipped with a disk cache memory in a conventional magnetic disk sub-system include a through mode where data is transferred between a high order channel apparatus and a low order device without passing through the cache memory, a hit mode wherein data is transferred between the high order channel apparatus and the cache memory without connecting the low order device, and a load/write-after mode wherein data is transferred between the cache memory and the device without connecting the high order channel apparatus. Among these three operation modes, the through mode operates synchronously between the high order channel apparatus and the low order device whereas the latter two modes are allowed to operate independently of each other or in other words, asynchronously and simultaneously, in order to improve utilization efficiency of data transfer paths.

As an apparatus of this kind related with the field of art, mention can be made of Japanese Patent Laid-Open No. 19260/1985.

FIG. 4(*a*) is a connection diagram of a conventional disk controller. In the drawing, a channel apparatus (hereinafter referred to as "CHL") 106 connected to a high order central processing unit (CPU) 101 and a device controller (hereinafter referred to as "CTL") 103 as a controller of low order disk devices (hereinafter referred to as "DISKs") 104, 104' are connected through disk controller (hereinafter referred to as "DKC") 102. This disk controller 102 has a plurality of transfer paths 105, 105' for executing data control and access control of DISKs 104, 104'. Incidentally, reference numerals 107, 107' represents paths and 10, 10', 28 and 28' represent interfaces.

DKC 102 includes a disk cache 4 and makes its control so that the record on DISKs 104, 104' and the record transferred from CHL 106 to DISKs 104, 104' are stored temporarily in the cache 4. Data transfer between CHL 106 and the cache 4 and data transfer between the cache 4 and CTL 103 can transfer separate records simultaneously with each other in order to utilize effectively the respective transfer paths. In other words, a channel adaptor 1 (1') for executing the transfer between CHL 106 and the cache 4 and a device adaptor 3 (3') for executing the transfer between the cache 4 and CTL 103 are disposed in each path 105, 105' and they can operate independently of each other.

The DKC 102 can operate in a transfer mode or control mode in which CHL 106 and CTL 103 are directly connected through the path 105 (or 105') to transfer data.

This occurs in the case of record mistake where the data is directly transferred between DISKs 104, 104' and CHL 106 without passing through the cache 4 when the intended record or disk track does not exist in the cache 4, or when a rotating position detection mechanism of the DISKs 104, 104' detects the rotational position and reports the position by making interrupt to CHL 106. In these cases, the channel adaptor 1 (or 1') and the device adaptor 3 (or 3') must be connected by the path 107 (or 107').

SUMMARY OF THE INVENTION

The prior art technique described above does not sufficiently consider effective utilization of paths when a plurality of sets of transfer paths, each set consisting of a path connecting and operating a high order channel device and a path connecting and operating a low order device (inclusive of CTL and a disk) that can operate mutually independently, exist inside a disk controller.

In other words, the operation mode by the direct connection between CHL and CTL such as described above cannot be executed because a path cannot be constructed while the channel adaptor 1 (or the device adaptor 3) of one of the transfer paths 105 and the device adaptor 3' (or the channel adaptor 1') of the other transfer path 105' are connected to the cache 4 and execute the simultaneous operation. In other words, the rotational position detection interrupt detected by the device adaptor 3 (or 3') from the DISK 104 (or 104') cannot be reported to CHL 106 because the channel adaptor 1 (or 1') of the path 105 (or 105') is being used. Similarly, as to the actuation for the transfer path 105' (or 105), BUSY cannot but be reported because the device adaptor 3' (or 3) is being used. As a result, the channel adaptor 1' (or 1) and the device adaptor 3 (or 3') cannot be utilized while they are free and there is the problem that optimum path utilization cannot be made inside DKC 102.

This problem will be explained further with reference to FIG. 4(*b*). In the drawing, while the channel adaptor 1 in the path 0 is operating with the cache, the device adaptor 3 in the path 0 cannot make an interrupt report and this report is made only after the end of the operation of the channel adaptor 1. While the device adaptor 3' in the path 1 is operating with the cache, the channel adaptor in the path 1 cannot make data transfer for the CHL actuation and cannot but report BUSY so that the data transfer is made only after the operation of the device adaptor 3' is complete.

As described above, the prior art technique does not have sufficiently high utilization efficiency of paths.

In an external memory system having a cache memory, it is therefore an object of the present invention to provide a path control system which can improve utilization efficiency of paths for data transfer and control between a high order channel apparatus and a low order memory control device.

To accomplish the object described above, the present invention disposes a plurality of sets of control paths, each consisting of a pair of a high order control path (channel adaptor) interposed between a high order apparatus such as a channel apparatus and a cache memory and a low order control path such as a device adaptor interposed between a low order device such as a device controller of a magnetic disk device and the cache memory, and makes transfer path control of data. As one of the features, the present invention disposes selection means such as a switch for selecting a free high order control path in an arbitrary set and a free low order control path in an arbitrary set, and makes direct data tranfer between the high order channel apparatus and the low order device through the selected high and low order control paths without passing through the cache memory.

One of the high order control paths such as the channel adaptors requests the connection of the low order control path such as the device adaptor for the selection means. The selection means selects an arbitrary one of the low order control paths, that is, a free path, on the basis of the operation state such as busy or free of the low order control paths of not only the sets to which the high order control paths generating the request but also of the low order control paths belonging to all the sets and on the basis of the priority between the high order control paths, connects the selected path to the high order channel apparatus and the low order device together with the high order control paths and attains the data transfer between them.

As a result, as will be shown in the later-appearing embodiment with reference to FIG. 1, even when the high order control path in one of the two sets of control paths and the low order control path in the other are connected to the cache and are operating, the data transfer and interrupt processing can be made directly between the high order channel apparatus and the low order device controller without passing through the cache by selecting the high order control path in the other of the two sets of control paths and the low order control path in one of them. In this manner, the free paths can be utilized most effectively.

It is also possible to construct the present invention in such a manner as to detect the fault of the high or low order control path when it is out of order, to cut it off and to select and employ the high or low order control path from other sets in place of the fault path. In this manner, reliability of the entire system including the external memory devices can be improved.

DESCRIPTION OF THE PREFERRED EMBODIMENT

Hereinafter, one embodiment of the present invention will be described with reference to the accompanying drawings.

Figure 1:
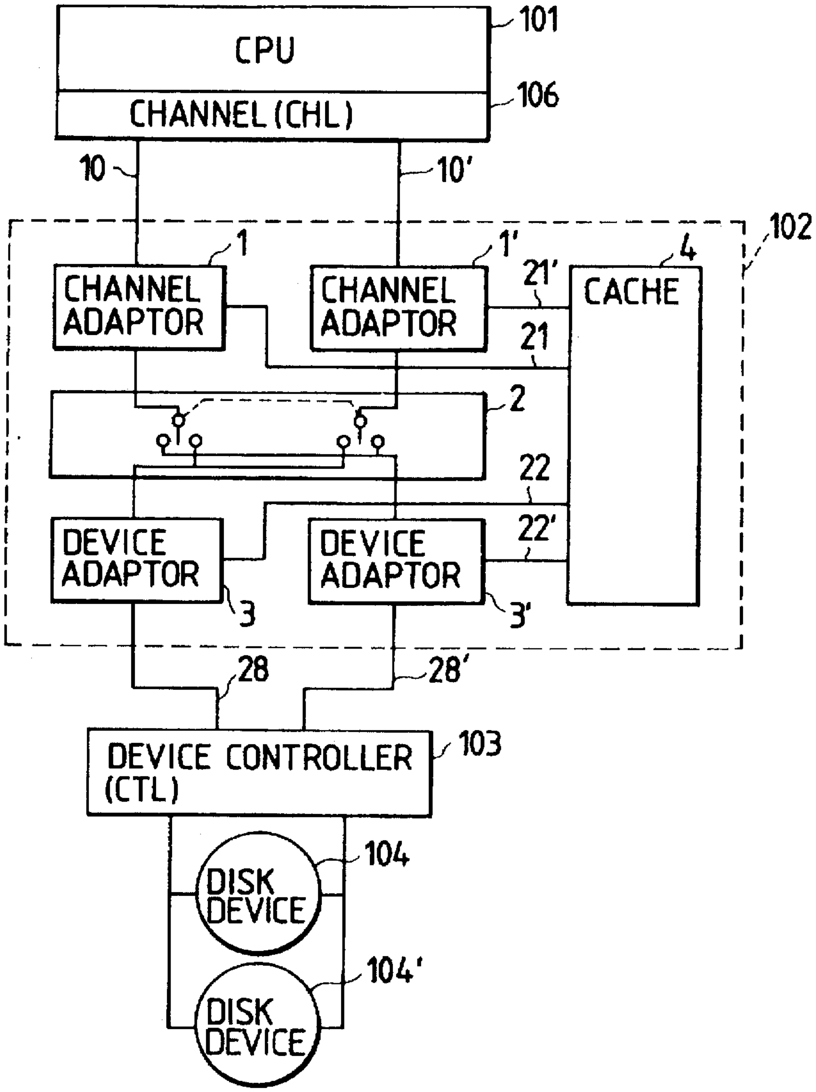
FIG. 1 is a block diagram showing the construction of an external memory system having a magnetic disk to which on embodiment of the present invention is applied.

FIG. 1 is a block diagram showing the construction of an external memory system, particularly a disk controller (hereinafter referred to as "DKC"), to which one embodiment of the present invention is applied.

DKC 102 is connected to a channel apparatus (hereinafter referred to as "CHL") 106 of a central processing unit (hereinafter referred to as "CPU") 101 as a high order apparatus through interfaces 10, 10' and to a device controller (hereinafter referred to as "CTL") 103 as a low order device through interfaces 28 and 28'. A plurality of magnetic disk devices (hereinafter referred to as "disks") 10 104, 104' are connected to this CTL 103.

CPU 1 processes the data read out from the magnetic disk devices. The magnetic disk devices 104, 104' are means for storing the data and a certain one of them is selected and actuated in accordance with the control of CTL 103 to thereby store and reproduce the data.

DKC 102 has the characterizing construction of the present invention. A plurality of channel adaptors 1, 1' are connected to CHL 106 through the interfaces 10, 10' and a plurality of device adaptors 3,3' are connected to the device controller 103 through the interfaces 28, 28'. The channel adaptors 1, 1' and the device adaptors 3,3' are further connected to a cache memory 4 through paths 21, 21' and paths 22, 22', respectively. The cache memory 4 stores temporarily the records of data transferred from the disks 104, 104' and the data transferred from CHL 106 to the disks 104, 104'.

The channel adaptors 1,1' and the device adaptors 3,3' can operate mutually independently, and the channel adaptors 1, 1' make data transfer with the cache memory 4 and with CHL 106 through the paths 21, 21'. The device adaptors 3, 3' make the data transfer with CTL 103 through the paths 22, 22' independently of the operation of the channel adaptors 1, 1'. Accordingly, the paths can be utilized efficiently for the data transfer and separate records can be transferred simultaneously.

It is another characterizing construction of the present invention that a switch 2 is desposed for the channel adaptors 1, 1' and the device adaptors 3, 3'. This switch 2 can switch the device adaptors 3, 3' to the channel adaptor 1 and can swithc the device device adaptors 3', 3 to the channel adaptor 1'.

This switch 2 operates in the following way. The channel adaptor 1 or 1' requires the switch 2 to connect the device adaptor 3 or 3'. Receiving this connection request, the switch 2 selects and connects the paths between the channel adaptors and the device adaptors in accordance with the busy of free state of the device adaptor 3 or 3' and on the basis of the priority between the channel adaptors 1 and 1'.

Figure 3:
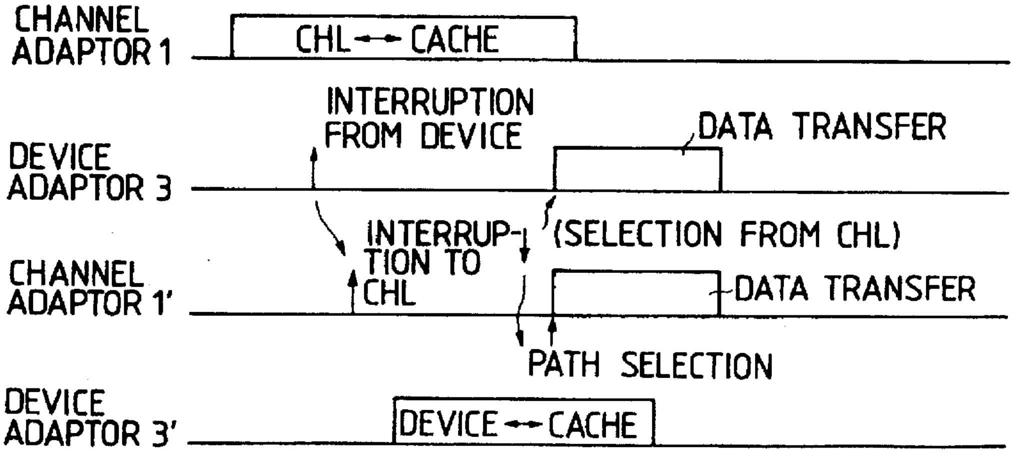
FIG. 3 is a time chart useful for explaining the operation of a path control in one embodiment of the present invention.

It will be hereby assumed that the data is transferred between CHL 106 and the cache memory 4 through the interface 10, the channel adaptor 1 and the path 21 as shown in FIG. 3. It will be assumed further that the device adaptor 3' makes the data transfer with the disk 104 or 104' and the cache memory 4 through CTL 103, the interface 28' and the path 22'. Then, when CHL 106 is actuated, an interruption from the device is generated and the device adaptor 3 accepts the interruption request. The switch 2 searches the empty path and connects it in such a manner as to form a path consisting of the device adaptor 3, the channel adaptor 1' and the interface 10' through the interface 28 in this case. Accordingly, the direct data transfer path is formed between the disk 104 or 104' and CPU 101.

In this manner, even when the channel adaptor 1 (or 1') of one of the paths and the device adaptor 3' (or 3) of the other path are operating while being connected to the cache memory 4, interrupt processing or data transfer can be made by directly connecting CHL 106, DISK 104, 104' by selecting and connecting the path between the channel adaptor 1 (or 1') and the device adaptor 3 (or 3'), and the empty path can be utilized most effectively.

Though the description given above deals with the case where the interrupt is generated by the actuation of CHL 106, the path switch control by the switch 2 is effected in the same way as above when the interrupt is generated by the actuation of the disk 104, 104', too.

Figure 2:
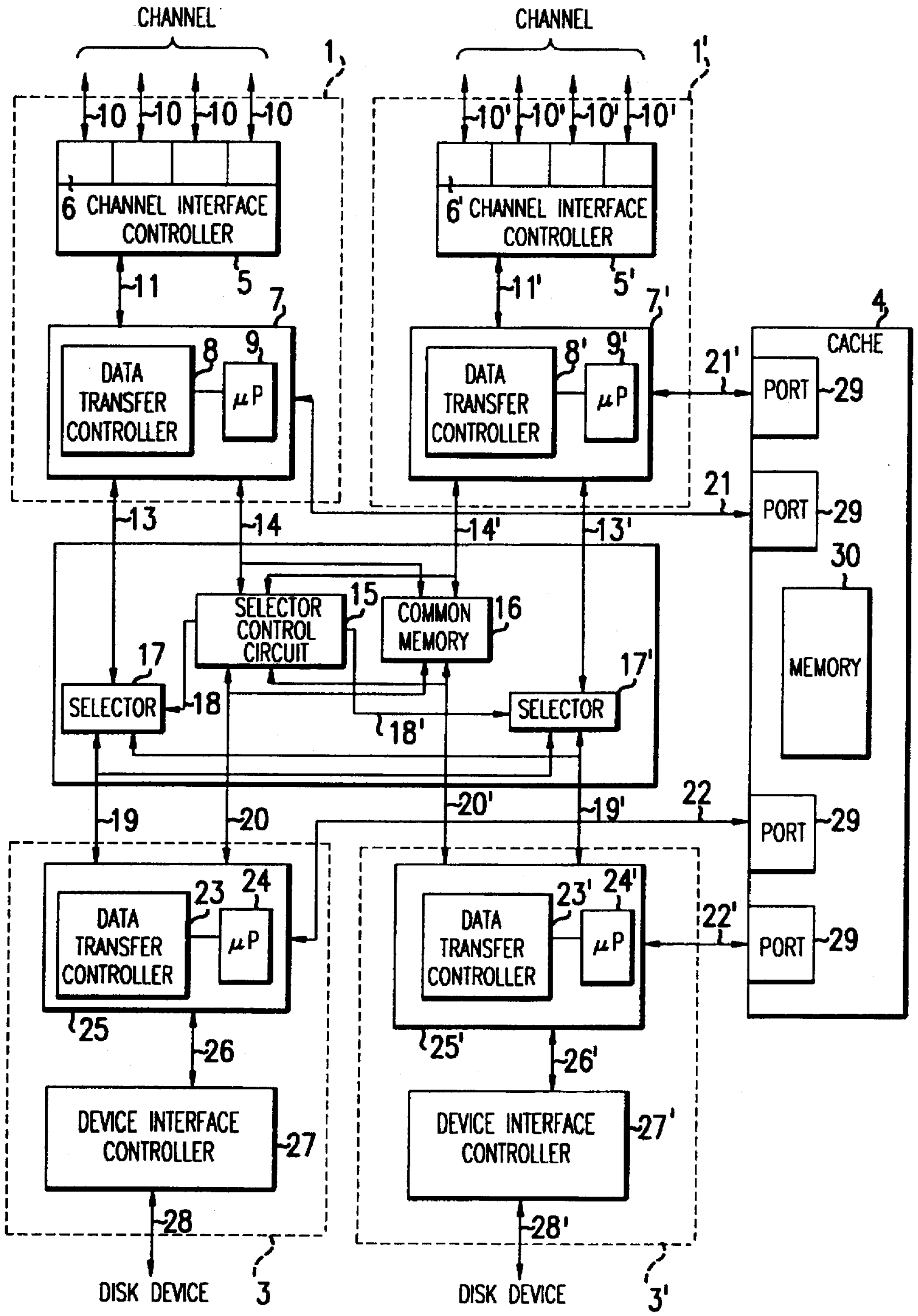
FIG. 2 is a block diagram showing in detail DKC in one embodiment of the present invention.
Figure 4A:
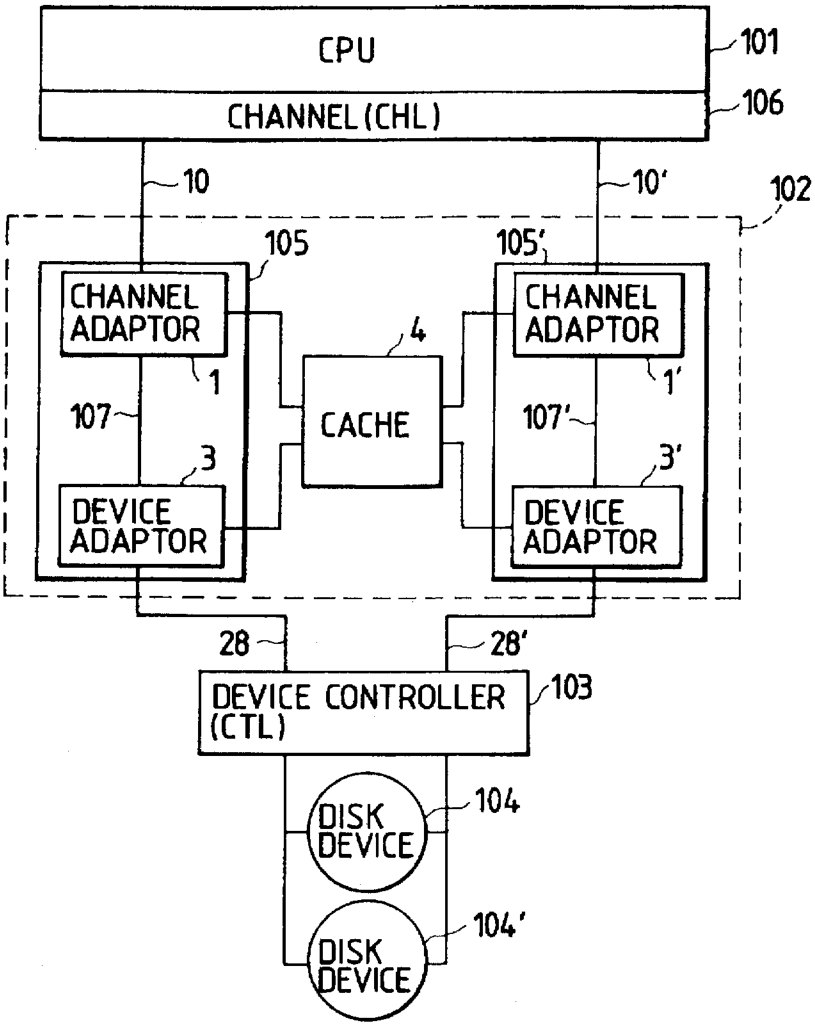
FIG. 4*a*and 4*b* shows the construction of DKC having a conventional cache memory, wherein FIG. 4(*a*) is its block diagram and (*b*) is an explanatory view useful for explaining its operation.
Figure 4B:
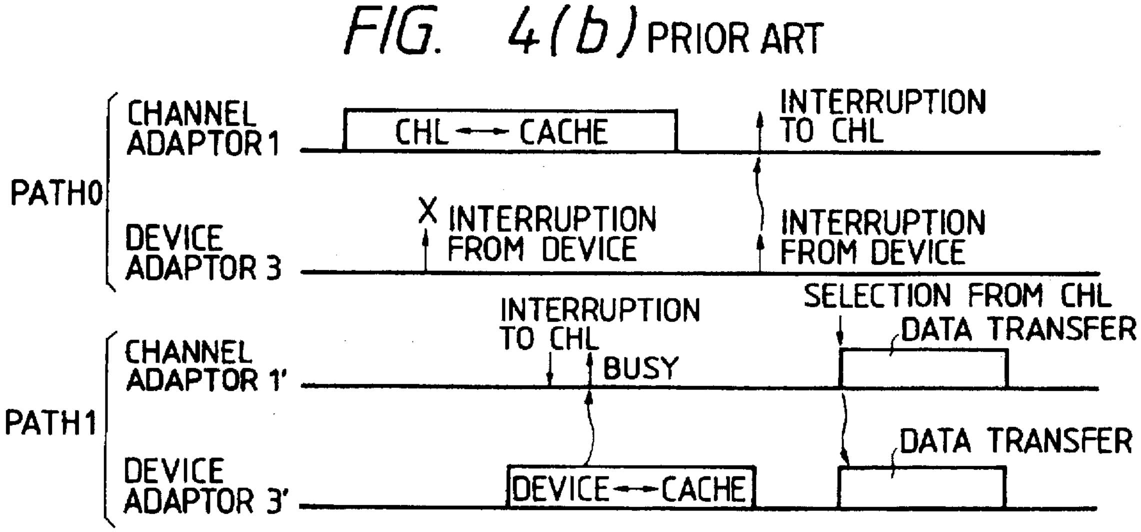

Next, the internal construction of DKC 102 will be explained in detail with reference to FIG. 2.

The channel adaptors 1, 1', the device adaptors 3, 3', the switch 2 and the cache memory 4 are equivalent to those shown in FIG. 1, respectively.

The channel adaptors 1, 1' are connected to the channel device (CHL) 106 as the high order apparatus through the interfaces 10. Each channel adaptor consists of a channel interface control portion 5,5' for sending, receiving and decoding a channel interface signal and a channel adaptor control portion 7, 7' for executing the sequence control of the channel interface, the data transfer control between the cache memory 4 and CHL 106 and the interface control between the channel adaptor 1, 1' and the device adaptor 3, 3' on the decoding result of the interface signal in the channel interface control portion 5, 5'. The channel interface control portion 5, 5' is equipped with a plurality of channel switches 6 and can be connected to a plurality of channels through these channel switches 6. Each channel adaptor control portion 7,7' is equipped with a micro-processor 9, 9' which is programmable by a microprogram for controlling the channel adaptor control portion 7, 7', the cache memory 4 and the channel interface control portion 5, 5', and with a data transfer control portion 8, 8' for controlling the data transfer in accordance with the instruction of the micro-processor 9.

On the other hand, each device adaptor 3, 3' consists of a device interface control portion 27, 27' for controlling the device interface 28 and a device adaptor control portion 25, 25' for executing the device interface sequence control, the data transfer control between the cache memory 4 and CTL 103 and the interface control to the channel adaptor. Each device adaptor control portion 25, 25' consists of a micro-processor 24, 24' which is programmable by a micro-program and a data transfer control portion 23, 23'.

The cache memory 4 consists of memory portions 30 each consisting of a semiconductor memory and cache ports 29. The cache ports 29 execute mutually independently their interface operations between them and the channel adaptors 1, 1' and between them and the device adaptors 3, 3'.

The switch 2 consists of a common memory area 16 for communicating the microprocessors 9, 9' of the channel adaptors 1, 1' with the micro-processors 24, 24' of the device adaptors 3, 3', selectors 17, 17' for switching the data transfer and control paths 19, 19' of the device adaptor 3 or 3' (3' or 3) to the data transfer paths 13, 13' of the channel adaptors 1, 1' and a selector control circuit 15 for giving a switch instruction to the selectors 17, 17' by the instruction of the channel adaptors 1 (1'). Incidentally, reference numerals 11, 11', 13, 13', 14, 14', 18, 18', 19, 19', 20, 20', 21, 21', 22, 22', and 26, 26' represent buses, respectively.

Access to all the disks 104, 104' can be made from the device adaptors 3 and 3', and when the channel switch 6 of the channel adaptor 1, 1' is connected to CHL 106 of the same channel group, the same processing can be made through either of the channel adaptors 1 and 1'.

In the construction described above, the path switch control by the switch 2 is effected in the following way.

Normally, when the device adaptor 3, 3' cannot accept the connection request by the channel adaptor 1, 1' such as when it executes the data transfer between the cache memory 4 and CTL 103, for example, it sets the BUSY state to the switch control circuit 15 through the control path 20 or 20'.

The micro-processor 9, 9' of the channel adaptor 1, 1' raises the connection request to the switch control circuit 15 through the control path 14, 14'. The switch control circuit 15 determines changeability and its route in accordance with a predetermined priority prepared in advance for the connection request, the BUSY state and the simultaneous connection requests by the micro-processors for the same route, and if the path is changeable, the control circuit 15 sends the switch signal 18, 18' to the selector 17, 17' and instructs it to switch. In this case, the micro-processor 9, 9' can know the connection state of the path due to switching through the control route 14, 14'.

When both the device adaptors 3, 3' are under the BUSY state and switching of the switch is not established, the micro-processor 9,9' can know that the switch of the paths is not established and that the device adaptors are under the BUSY stae, through the control route 14, 14' in the same way as described above.

Similarly, the processor 24, 24' on the device adaptor side can refer to the connection state described above through the control route 20, 20' so that each processor can confirm the connection state with each other.

The communication between the channel adaptor 1, 1' and the device adaptor 3, 3' is made throught the common memory 16. Here, the occurrence of rotational position detection interrupt of the disks 104, 104' is reported from the device adaptor 3, 3' to the channel adaptor 1, 1' through the memory 16. The free channel adaptor 1 or 1' which is inoperative reads out periodically the memory 16 and reports if any interrupt factor exsists, to the high order CHL 106. Control information such as the disk address during the disk connection, the record count at the time of data transfer and the record position information are communicated mutually between the channel adaptors 1, 1' and the device adaptors 3, 3' that are under the connected state.

Data transfer after the path switch by the selector 17 is effected in the same way for the device adaptor 3 of its own system as well as for the device adaptor 3' of the other system. When, for example, the channel adaptor 1 of its own system and the device adaptor 3' of the other system are connected, the data are transferred between the channel adaptor 1 and the device adaptor 3' through the path 13, the selector 17 and the path 19'.

According to this embodiment, the same function can be executed if the other adaptor is not used even when one of the adaptors (e.g. the channel adaptor 1 (or 1' )) or device adaptor 3 (or 3' )) in the path is being used. In this manner, the embodiment can optimize path utilization efficiency.

Though the embodiment described above represents the case of two sets of control paths, it can be applied similarly to the cases where three or more sets of control paths exist.

Though the embodiment described above represents the case where either one of the high order control path (channel adaptor) and the low order control path (device adaptor) in one set of control paths is busy (or is connected to the cache memory 4), it can be applied similarly if either one of the high and low order control paths is out of order sothat the fault path can be cut off and the transfer control route can be established to improve reliability. This can be accomplished by the steps of judging the fault state of an arbitrary high or low order control path, cutting off the high or low order control path which is judged as fault, and selecting an access route to the high order channel or to the low order device which substitutes the high or low order control path that is cut off. In other words, an arrangement is made so that the micro-processor 9, 9' of each channel adaptor 1, 1' or the micro-processor 24, 24' of the device adaptor 3, 3' can recognize the fault of the high or low order path. When the high or low order path is out of order, these micro-processors write the fault information into the common memory 16 of the switch 2. On the other hand, the other micro-processor judge the judge the fault of a certain path by searching this memory 16, and the switch control portion 15 instructs the selector 17, 17' to avoid the fault path.

If a plurality of sets of control paths exist inside the controller, the system throughput can be improved by controlling the path selection so as to avoid the connection concentration on a specific control path.

Data transfer can be made by the construction wherein a common bus is provided so as to connect all the high order control paths and all the low order control paths constituting a plurality of sets of control paths and is shared on the time division basis between an arbitrary low order control path and an arbitrary low order control path.

Incidentally, the path reaching the low order device is selected by low order path selection means at the time of the high order channel actuation to generate the connection request for the low order path, and high order path selection means selects the path reaching the high order central processing unit at the time of the low order device actuation (at the time of interrupt request from the device).

It is possible to secure an alternative path and thus to improve reliability by providing a switch connection function and a path switch function with a plurality of disk controllers through one channel of the central processing unit and the controller path by use of the switch means of the embodiment described above.

What is claimed is:

1. A data transfer controller between a high order apparatus and a low order device, comprising:

(a) a cache memory, said cache memory being able to temporarily store data transferred between the high order apparatus and the low order device;

(b) a plurality of first paths, each of said first paths being able to transfer data between the high order apparatus and said cache memory, each of said first paths including a first adaptor;

(c) a plurality of second paths, each of said second paths being able to transfer data between said cache memory and the low order device, each of said second paths including a second adaptor; and (d) means for selecting one of said first paths, available for data transfer, and one of said second paths, available for data transfer, and constructing a third path, said third path transferring data through said first and second adapters of said selected paths.

2. A data transfer controller according to claim 1, wherein the construction of said third path is made based on a path connection request from said first adaptor.

3. A data transfer controller according to claim 2, wherein said high order apparatus is a channel device and said low order device is a plurality of magnetic disk devices.

4. A data transfer controller according to claim 2, wherein each of said first adaptors is equipped with means for recognizing whether or not an interrupt for the data transfer from said second adaptor exists, and wherein a request for constructing said third path is generated to said path selection means when said recognition means detects the existence of said interrupt.

5. A data transfer controller according to claim 4, wherein said selection means is connected to said plurality of first adaptors and to said plurality of second adaptors and is equipped with memory means for storing an interrupt request from at least said second adaptors, and said recognition means reads periodically said memory means and detects the existence of said interrupt request.

* * * * *